(12) United States Patent
Uhlhorn et al.

(10) Patent No.: US 8,346,077 B1
(45) Date of Patent: Jan. 1, 2013

(54) MULTI-DOMAIN SYSTEMS AND METHODS FOR FAIL SECURE INFORMATION TRANSFER

(75) Inventors: Brian L. Uhlhorn, St. Paul, MN (US); Howard J. Schantz, Inver Grove Heights, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 314 days.

(21) Appl. No.: 12/765,171

(22) Filed: Apr. 22, 2010

(51) Int. Cl.
*G02F 1/00* (2006.01)
*G02F 2/00* (2006.01)
*H01S 3/00* (2006.01)
*H04B 10/00* (2006.01)
*H04J 14/00* (2006.01)
*H04B 10/08* (2006.01)
*H04B 17/00* (2006.01)
*G06F 11/00* (2006.01)
*G06F 12/14* (2006.01)
*G06F 12/16* (2006.01)
*G06F 15/173* (2006.01)
*G08B 23/00* (2006.01)

(52) U.S. Cl. .................... 398/1; 726/22; 398/8; 398/36; 709/224

(58) Field of Classification Search .................... 398/36, 398/1, 8; 726/22; 713/153; 709/224
See application file for complete search history.

(56) References Cited

U.S. PATENT DOCUMENTS

| | | | |
|---|---|---|---|
| 6,442,694 B1 * | 8/2002 | Bergman et al. ................ | 726/22 |
| 6,738,345 B1 * | 5/2004 | Williamson ................... | 370/217 |
| 7,797,436 B2 * | 9/2010 | Banerjee et al. ............... | 709/229 |
| 2002/0027682 A1 * | 3/2002 | Iwasaki et al. ................ | 359/110 |
| 2005/0047356 A1 * | 3/2005 | Fujii et al. ..................... | 370/311 |
| 2006/0093356 A1 * | 5/2006 | Vereen et al. ................... | 398/33 |
| 2007/0223917 A1 * | 9/2007 | Nagamine ........................ | 398/1 |
| 2007/0230958 A1 * | 10/2007 | Jiang et al. ..................... | 398/72 |
| 2007/0274719 A1 * | 11/2007 | Ferguson et al. ............... | 398/66 |
| 2008/0056719 A1 * | 3/2008 | Bernard et al. ................. | 398/71 |
| 2008/0138062 A1 * | 6/2008 | Tyrrell et al. ................... | 398/2 |
| 2008/0152340 A1 * | 6/2008 | Hung et al. ..................... | 398/2 |
| 2008/0152341 A1 * | 6/2008 | Hung et al. ..................... | 398/2 |
| 2008/0152342 A1 * | 6/2008 | Hung et al. ..................... | 398/5 |
| 2008/0162981 A1 * | 7/2008 | Jajoo et al. ..................... | 714/2 |
| 2008/0225803 A1 * | 9/2008 | Tanaka .......................... | 370/338 |
| 2009/0214222 A1 * | 8/2009 | Grossman et al. ............. | 398/173 |
| 2011/0033180 A1 * | 2/2011 | Smith et al. ..................... | 398/1 |
| 2011/0044685 A1 * | 2/2011 | Ota et al. ....................... | 398/15 |

OTHER PUBLICATIONS

ITU-T G.983.1 Broadband optical access systems based on Passive Optical Networks (PON). Jan. 2005. p. 1-124.*
ITU-T G.983.5 A broadband optical access system with enhanced survivability. Jan. 2002. p. 1-60.*

* cited by examiner

*Primary Examiner* — Christian Laforgia
(74) *Attorney, Agent, or Firm* — Hamre, Schumann, Mueller & Larson, P.C.

(57) ABSTRACT

Systems and techniques for regulating the security of information flow can include multiple information receiving/transmitting domains where a device failure in one or more domains would not comprise the security of the systems. The systems and techniques may be implemented using a multi-domain checking approach in which the respective device operation status in each receiving/transmitting domain is independently monitored. The systems and techniques can advantageously prevent sensitive information from being inadvertently transferred to an untrusted or unauthorized entity.

12 Claims, 2 Drawing Sheets

MULTI-DOMAIN SYSTEMS AND METHODS FOR FAIL SECURE INFORMATION TRANSFER

FIELD

This disclosure relates to systems and methods for secured information transfer.

BACKGROUND

Highly sensitive information such as government security information needs to be safeguarded against unauthorized use or disclosure. Conventional security systems and techniques may be inadequate in providing requisite heightened security measures since an equipment failure in one or more of the information transfer devices used by the conventional security systems can lead to accidental leakage of the highly sensitive information to an untrusted or unauthorized party or entity.

SUMMARY

Systems and techniques for fail secure information transfer are provided that include multiple information receiving/transmitting domains where a device failure in one or more domains would not comprise the security of the systems. The systems and techniques provided herein employ a multi-domain checking approach at the hardware level. For example, in systems and techniques that utilize a combination of an optical domain (e.g., a photonic on/off switch) and an electrical domain (e.g., a photonic receiver) arranged in series, a first check is performed in the optical domain to verify the operation status of the device in the optical domain and a second check is performed in the electrical domain to verify the operation status of the device in the electrical domain, where each check operates independently of the other. The systems and techniques provided herein can advantageously prevent sensitive information from being inadvertently transferred to an untrusted or unauthorized entity.

In one aspect, a fail secure information transfer system includes a first device that operates in a first domain. The first device can output a first signal. The system also includes a second device that operates in a second domain. The second device is connected to the first device to receive the first signal outputted by the first device and can output a second signal. The system further includes a controller that is connected to the first device and the second device. The controller can control the operational status of the first device and the second device between enabled operational states and disabled operational states. The controller includes a first status check module that can determine if the first device is outputting the first signal when the first device is in a disabled operational state. The first status check module can then send a disable command signal to the second device to place the second device in the disabled operational state. The controller also includes a second status check module that can determine if the second device is outputting the second signal when the second device is in a disabled operational state. The second status check module can then send a disable command signal to the first device to place the first device in the disabled operational state.

In another aspect, a method for fail secure information transfer includes determining if a first device that operates in a first domain and can output a first signal is outputting the first signal when the first device is in a disabled operational state. The method also includes determining if a second device that operates in a second domain and is connected to the first device to receive the first signal outputted by the first device and can output a second signal is outputting the second signal when the second device is in a disabled operational state. The method further includes sending a disable command signal to the second device to place the second device in the disabled operational state if the first device is determined to output the first signal when the first device is in the disabled operational state. The method also includes sending a disable command signal to the first device to place the first device in the disabled operational state if the second device is determined to output the second signal when the second device is in the disabled operational state.

DRAWINGS

DETAILED DESCRIPTION

Computing resource equipments, such as single board processors, may be interconnected into a multi-port network switch implementation, based on an optical WDM (wavelength division multiplexing) star/coupler architecture approach. For networks that support multi-enclave information, a secure multi-port network switch implementation may be needed to protect each enclave by providing, with a high degree of confidence, both a strong port-to-port separation and an ability to securely block specific ports from receiving/transmitting unauthorized information flows.

This disclosure provides systems and techniques for secured information transfer that include two or more devices arranged in series that may receive, regulate, process and/or transmit one or more information-carrying signals. The systems and techniques also include a controller that may monitor and control the operation status of the two or more signal receiving/transmitting devices based on an algorithm with prescribed security rules and policies. When information flow is prohibited by the algorithm, the controller, upon a detection of an equipment failure in any one of the signal receiving/transmitting devices, can take proper actions to ensure that the rest of the signal receiving/transmitting devices are actually disabled. This can advantageously prevent such an equipment failure from causing information to be accidentally transmitted to an unauthorized or untrusted user or entity.

Figure 1:
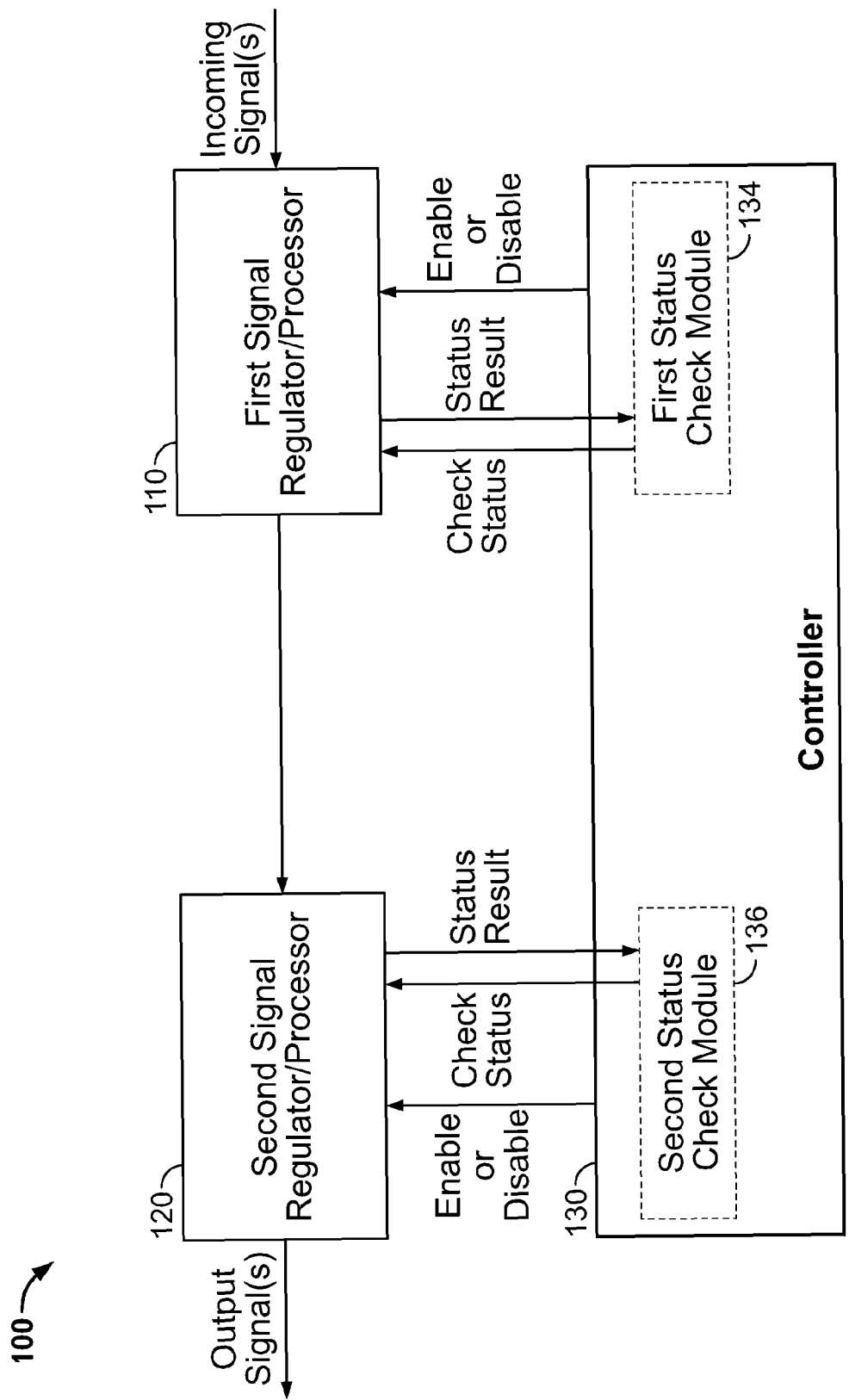
FIG. 1 is a block diagram of an exemplary fail secure information transfer system.

Referring now to FIG. 1, an exemplary fail secure information transfer system 100 includes a first signal regulator/processor 110. The first signal regulator/processor 110 can be any device that is capable of receiving, regulating and/or processing one or more signals including radio, electrical, optical, electromagnetic, RF (radio frequency) signals or other types of signals and transmitting the one or more signals to another device or distributing the one or more signals among several other devices. In one exemplary embodiment, the first signal regulator/processor 110 is a switch that can direct an incoming signal to a single output or to an output selected from several outputs. In another exemplary embodiment, the first signal regulator/processor 110 is a multiplexer that can select one signal from several input signals and forward the selected signal to an output or combine several input signals into one signal and forward the combined signal to an output. In still another exemplary embodiment, the first signal regulator/processor 110 is a demultiplexer that can split an incoming signal into several output signals and route the output signals to selected outputs. In yet another exemplary embodiment, the first signal regulator/processor 110 is a receiver that can receive an incoming signal and convert the incoming signal into a different type of signal and then relay the converted signal to an output. In another exemplary embodiment, the first signal regulator/processor 110 is a transmitter that can send a signal to a receiver. In still another exemplary embodiment, the first signal regulator/processor 110 is a transceiver that can function as a transmitter and a receiver.

The exemplary system 100 also includes a second signal regulator/processor 120. The second signal regulator/processor 120 can also be any device that is capable of receiving, regulating and/or processing one or more signals including radio, electrical, optical, electromagnetic, RF signals or other types of signals and transmitting the one or more signals to another device or distributing the one or more signals among several other devices. In one exemplary embodiment, the second signal regulator/processor 120 is a switch that can direct an incoming signal to a single output or to an output selected from several outputs. In another exemplary embodiment, the second signal regulator/processor 120 is a multiplexer that can select one signal from several input signals and forward the selected signal to an output or combine several input signals into one signal and forward the combined signal to an output. In still another exemplary embodiment, the second signal regulator/processor 120 is a demultiplexer that can split an incoming signal into several output signals and route the output signals to selected outputs. In yet another exemplary embodiment, the second signal regulator/processor 120 is a receiver that can receive an incoming signal and convert the incoming signal into a different type of signal and then relay the converted signal to an output. In another exemplary embodiment, the second signal regulator/processor 120 is a transmitter that can send a signal to a receiver. In still another exemplary embodiment, the second signal regulator/processor 120 is a transceiver that can function as a transmitter and a receiver.

The exemplary system 100 can include any suitable combinations of devices described herein for the first signal regulator/processor 110 and the second signal regulator/processor 120 that would allow one or more information-carrying signals to be propagated through the system 100. For example, one exemplary embodiment includes an optical switch as the first signal regulator/processor 110 and an optical receiver as the second signal regulator/processor 120 where the optical switch routes an optical signal from a fiber optic or integrated optical circuit to the optical receiver and the optical receiver converts the optical signal to an electrical or electromagnetic signal for output. Another exemplary embodiment includes an electrical multiplexer as the first signal regulator/processor 110 and an optical transmitter as the second signal regulator/processor 120 where the electrical multiplexer selects an electrical signal from several input electrical signals or combines several input signals into one signal and relays the selected or combined electrical signal to the optical transmitter and the optical transmitter uses the electrical signal as an input to modulate an opto-electronic device, such as a light emitting diode, to produce an optical signal. Still another exemplary embodiment includes an RF receiver as the first signal regulator/processor 110 and an electrical demultiplexer as the second signal regulator/processor 120 where the RF receiver converts an RF signal to an electrical signal and transmits the electrical signal to the electrical demultiplexer and the electrical demultiplexer splits the electrical signal into several output electrical signals. Yet another exemplary embodiment includes an optical receiver as the first signal regulator/processor 110 and an electronic deserializer (SERDES) as the second signal regulator/processor 120 where the optical receiver converts an optical signal to an electrical signal and transmits the electrical signal to the electronic deserializer and the electronic deserializer converts the electrical signal to a logical data byte.

The exemplary system 100 further includes a controller 130. The controller 130 can be any device that is capable of controlling the operations of the first signal regulator/processor 110 and the second signal regulator/processor 120 according to predetermined security rules and policies. For example, if information flow is to be permitted, the controller 130 can enable both the first signal regulator/processor 110 and the second signal regulator/processor 120 so that one or more information-carrying signals can be received, regulated and/or processed by the first signal regulator/processor 110 and then forwarded to the second signal regulator/processor 120 where the one or more signals can be further converted, processed and/or delivered to one or more selected devices or entities. If information flow is to be prohibited, the controller 130 can disable the first signal regulator/processor 110 or the second signal regulator/processor 120 or both such that any information-carrying signals are intended to be blocked from being transmitted through the security system 100. In one exemplary embodiment, the controller 130 is a general or specialized computer or microprocessor that can enable and disable the first signal regulator/processor 110 and the second signal regulator/processor 120 according to a predetermined security algorithm.

The controller 130 includes a first status check module 134 that is capable of checking the operation status of the first signal regulator/processor 110 (e.g., whether or not the first signal regulator/processor 110 is transmitting any signals) for analysis by the controller 130. The controller 130 also includes a second status check module 136 that is capable of checking the operation status of the second signal regulator/processor 120 (e.g., whether or not the second signal regulator/processor 120 is transmitting any signals) for analysis by the controller 130. The operation status of the regulators/processors 110, 120 can be determined using a variety of known methods.

For example, the operation status of an electrical receiver can be determined using a signal detector attached to the receiver. The operation status of a serializer/deserializer can be determined using a data recovery indicator disposed on the serializer/deserializer. The operation status of an optical receiver such as a low speed photodiode can be determined using an optical power tap to the photodiode. Operation status check can also include checking if a device is drawing or consuming power (e.g., some optical switches must draw power in order to let light pass).

During the operation of the exemplary system 100, the first and second status check modules 134, 136 can continuously or at preselected time intervals check the operation status of the first and second signal regulators/processors 110, 120, respectively. When information flow should be allowed by the exemplary system 100, if the status check modules 134, 136 determine that either the first signal regulator/processor 110 or the second signal regulator/processor 120 or both cannot transmit or is (are) not transmitting any signals, that is, either the first signal regulator/processor 110 or the second signal regulator/processor 120 or both may be in a disabled or malfunction state, the controller 130 may attempt to enable the signal regulator(s)/processor(s) that is (are) not transmitting signals. If the controller 130 is successful in enabling the signal regulator(s)/processor(s) to transmit signals, the security system 100 may continue to operate without any disruption. If the controller 130 fails to enable the signal regulator(s)/processor(s), the controller 130 can take suitable actions, for example, issuing a warning to an operator or a control center reporting the malfunction status of the signal regulator(s)/processor(s) so that proper actions may be taken to correct the malfunction issue.

When the information flow should be prohibited by the exemplary system 100, if the status check modules 134, 136 determine that either the first signal regulator/processor 110 or the second signal regulator/processor 120 can still transmit or is still transmitting signals, that is, either the first signal regulator/processor 110 or the second signal regulator/processor 120 may be in an enabled or malfunction state, the controller 130, optionally in addition to attempting to disable the signal regulator/processor that can still transmit or is still transmitting signals, would take further actions to ensure that the other signal regulator/processor is indeed disabled (e.g., by attempting to disable the other signal regulator/processor) so that signals will not be accidentally transmitted through the system 100. This provides an added security measure where a device failure in one of the two signal regulators/processors 110, 120 cannot comprise the security of the system 100. If the controller 130 is successful in disabling both signal regulators/processors 110, 120, the system 100 may continue to operate without any disruption. If the controller 130 fails to disable either the signal regulator/processor that can still transmit or is still transmitting signals or the other signal regulator/processor in particular, the controller 130 can take suitable actions, for example, issuing a warning to an operator or a control center reporting the malfunction status of one or both of the signal regulators/processors 110, 120 so that appropriate actions may be taken to correct the malfunction issue.

The exemplary fail secure information transfer system 100 illustrated in FIG. 1 uses two signal receiving/transmitting domains (e.g., the first signal regulator/processor 110 and the second signal regulator/processor 120) to prevent an equipment failure in one domain from comprising the security of the system 100. Other exemplary fail secure information transfer systems can utilize three or more domains to provide even higher security measures based on the specific requirements of individual applications.

For example, an exemplary fail secure information transfer system can include three or more signal regulators/processors arranged in series where each regulator/processor is capable of receiving, regulating, processing and/or transmitting one or more information-carrying signals. The exemplary system can also include a controller that is capable of controlling the operations of the three or more signal regulators/processors based on a predetermined security algorithm. The controller can include three or more status check modules configured to respectively check the operation status of the three or more signal regulators/processors and communicate the status check results to the controller. When information flow should be prohibited by the system, a determination by the status check modules that one or more of the signal regulators/processors can still transmit or are still transmitting signals would cause the controller, optionally in addition to attempting to disable the one or more signal regulators/processors that can still transmit or are still transmitting signals, to take appropriate actions to ensure that the rest of the signal regulators/processors are in fact disabled (e.g., by disabling the rest of the signal regulators/processors) such that a device failure in one or more of the signal regulators/processors cannot compromise the security of the system.

Figure 2:
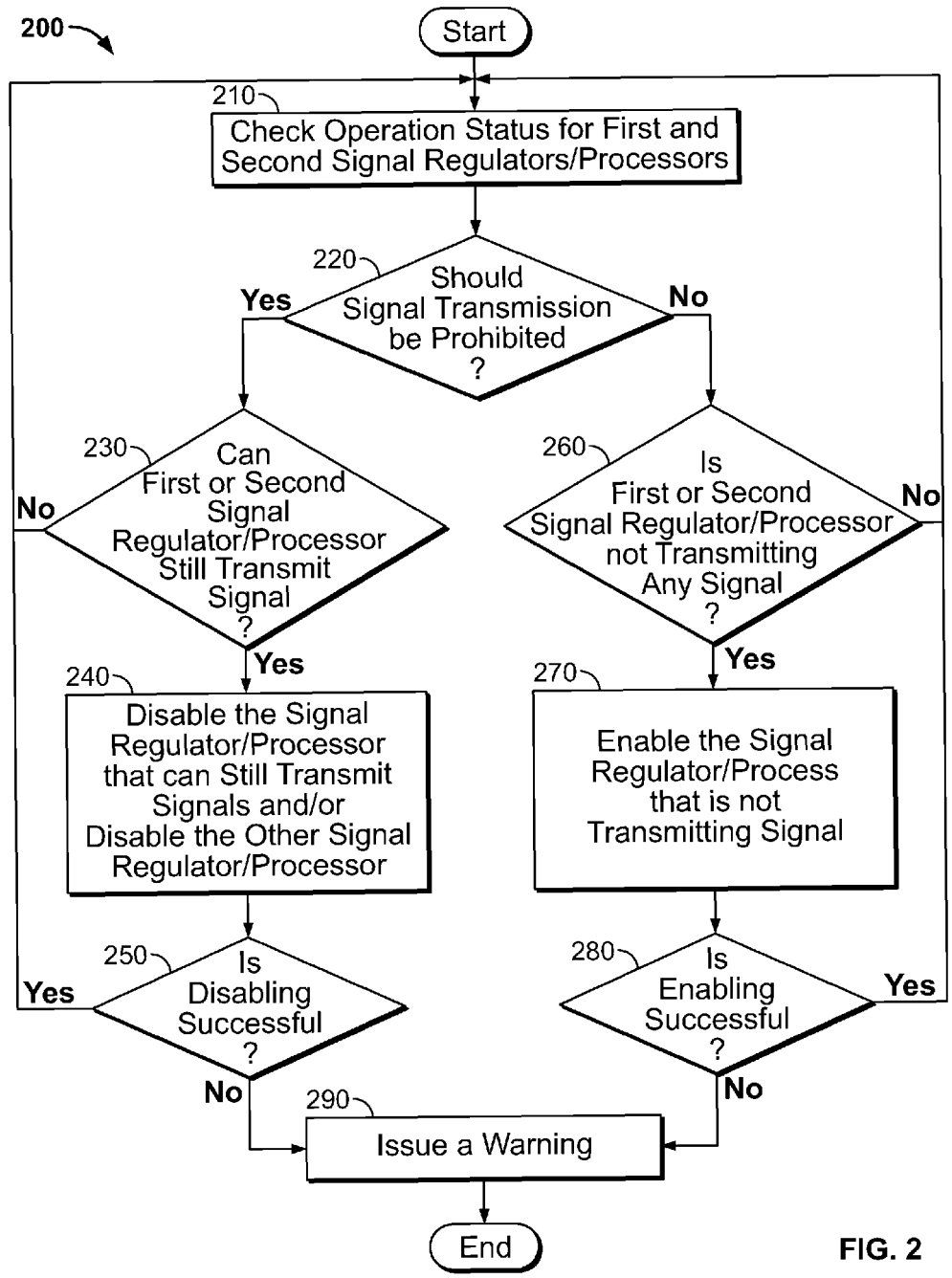
FIG. 2 is a flowchart of an exemplary method utilizing the fail secure information transfer system shown in FIG. 1.

Turning now to FIG. 2, an exemplary method 200 is provided that can be implemented with the exemplary fail secure information transfer system 100 illustrated FIG. 1. The exemplary method 200 is advantageous in avoiding inadvertent leakage of information to an untrusted or unauthorized party or entity even though one of the two signal regulators/processors 110, 120 within the exemplary system 100 fails to function normally.

The exemplary method 200 starts at step 210 where the operation status of the first and second signal regulators/processors 110, 120 are determined respectively by the first and second status check modules 134, 136. At step 220, the controller 130 decides, based on an external command or a preselected security algorithm, if signal transmission should be allowed or prohibited by the security system 100. If signal transmission should be prohibited, at step 230 the controller 130 analyzes the status check results obtained at step 210 to determine if either the first signal regulator/processor 110 or the second signal regulator/processor 120 or both can still transmit or is (are) still transmitting signals. If none of the two signal regulators/processors 110, 120 can still transmit or is still transmitting signals as desired, the exemplary method 200 then returns back to step 210 where the two status check modules 134, 136 continue to monitor the operation status of the two signal regulators/processors 110, 120, respectively. If either the first signal regulator/processor 110 or the second signal regulator/processor 120 can still transmit or is still transmitting signals, the controller 130 at step 240 attempts to disable the signal regulator/processor that can still transmit or is still transmitting signals and/or the other signal regulator/processor. At step 250, the controller 130 commands the two status check modules 134, 136 to re-check the operation status of the two signal regulators/processors 110, 120, respectively, and verifies, based on the status check results, if the disablement of both signal regulators/processors 110, 120 is successful. If the controller 130 successfully disables both signal regulators/processors 110, 120, the exemplary method 200 then returns back to step 210 where the operation status check on the two signal regulators/processors 110, 120 takes place. If the controller 130 is unable to disable either the signal regulator/processor that can still transmit or is still transmitting signals or the other signal regulator/processor or both, the controller 130 at step 290 takes suitable actions. For example, the controller 130 can issue a warning message reporting the malfunction status of one or both of the two signal regulators/processors 110, 120 so that corrective actions may be taken. On the other hand, if signal transmission should be allowed, at step 260 the controller 130 analyzes the status check results obtained at step 210 to determine if either the first signal regulator/processor 110 or the second signal regulator/processor 120 or both is (are) not transmitting any signals. If both signal regulators/processors 110, 120 are transmitting signals as desired, the exemplary method 200 then returns back to step 210 where the two status check modules 134, 136 continue to monitor the operation status of the two signal regulators/processors 110, 120, respectively. If either the first signal regulator/processor 110 or the second signal regulator/processor or both is (are) not transmitting signals, the controller 130 at step 270 attempts to enable the signal regulator(s)/processor(s) that is (are) not transmitting signals. At step 280, the controller 130 commands the corresponding status check module(s) to re-check the operation status of the signal regulator(s)/processor(s) that is (are) not transmitting signals, and verifies, based on the status check result(s), if the enablement of the signal regulator(s)/processor(s) is successful. If the controller 130 is able to enable the signal regulator/processor that is (are) not transmitting signals, the exemplary method 200 then returns back to step 210 where the operation status check on the signal regulators/processors 110, 120 takes place. If the controller 130 fails to enable the signal regulator(s)/processor(s) that is (are) not transmitting signals, the controller 130 at step 290 takes suitable actions. For example, the controller 130 can issue a warning message reporting the malfunction status of the signal regulator(s)/processor(s) so that corrective actions may be taken.

The exemplary method 200 illustrated in FIG. 2 can also be implemented with other exemplary fail secure systems that utilize three or more signal receiving/transmitting domains to provide even higher security measures based on the specific requirements of individual applications.

The systems and techniques described herein find applications in data security, data transmission and communications, and information assurance for commercial network device/infrastructure, embedded computer systems and platform integrators where heightened security in information transfer may be needed. For example, the systems and techniques described herein can be used as an interconnecting layer between a trusted enclave within which highly sensitive information may be processed and an untrusted or public domain. The systems and techniques can regulate information flow between the trusted enclave and the untrusted or public domain using a preselected set of security configurations and policies so as to prevent highly sensitive information from being inadvertently leaked out into the untrusted or public domain.

The systems and techniques described herein can also be used to distribute the processing among different signal/image processors that deal with all information that reaches them.

The examples described in this disclosure are to be considered in all respects as illustrative and not limiting. The scope of the disclosure is indicated by the appended claims rather than by the foregoing description; and all changes which come within the meaning and range of equivalency of the claims are intended to be embraced therein.

The invention claimed is:

1. A fail secure information transfer system, comprising:
a first device operating in a first domain that is configured to output a first signal;
a second device operating in a second domain that is connected to the first device to receive the first signal outputted by the first device and is configured to output a second signal;
a controller connected to the first device and the second device, the controller configured to control the operational status of the first device and the second device between enabled operational states and disabled operational states, the controller including:
a first status check module configured to determine if the first device is outputting the first signal when the first device is in a disabled operational state and to send a disable command signal to the second device to place the second device in the disabled operational state; and
a second status check module configured to determine if the second device is outputting the second signal when the second device is in a disabled operational state and to send a disable command signal to the first device to place the first device in the disabled operational state.

2. The system of claim 1, wherein the first device comprises a component selected from the group consisting of electrical, optical, electromagnetic or RFID switches, multiplexers, demultiplexers, receivers, transmitters, transceivers, and serializers/deserializers.

3. The system of claim 1, wherein the second device comprises a component selected from the group consisting of electrical, optical, electromagnetic or RFID switches, multiplexers, demultiplexers, receivers, transmitters, transceivers, and serializers/deserializers.

4. The system of claim 1, wherein the first signal comprises a signal of a first type and the second signal comprises a signal of a second type.

5. The system of claim 4, wherein the first signal comprises an optical signal and the second signal comprises an electrical, electromagnetic or RF signal.

6. The system of claim 4, wherein the first signal comprises an optical signal and the second signal comprises another optical signal.

7. The system of claim 4, wherein the first signal comprises an electrical signal and the second signal comprises a logical signal.

8. The system of claim 1, wherein the first device comprises an optical switch and the second device comprises an optical receiver.

9. The system of claim 1, further comprising at least a third device operating in a third domain that is connected to the second device to receive the second signal outputted by the second device and is configured to output a third signal; wherein the controller is further connected to the third device and configured to control the operational status of the third device between an enabled operational state and a disabled operational state; wherein the controller further comprises at least a third status check module configured to determine if the third device is outputting the third signal when the third device is in a disabled operational state and to send a disable command signal to the first device or the second device or both to place the first device or the second device or both in the disabled operational state.

10. A method for fail secure information transfer, comprising:
for a first device of a system operating in a first domain, is capable of receiving, regulating and/or processing a signal, and that is configured to output a first signal, using a controller connected to the first device to determine if the first device is outputting the first signal when the first device is in a disabled operational state;
for a second device of the system operating in a second domain, is capable of receiving, regulating and/or processing a signal, and that is connected to the first device to receive the first signal outputted by the first device and is configured to output a second signal, using the controller connected to the second device to determine if the second device is outputting the second signal when the second device is in a disabled operational state;
sending a disable command signal from the controller to the second device to place the second device in the disabled operational state if the first device is determined to output the first signal when the first device is in the disabled operational state; and
sending a disable command signal from the controller to the first device to place the first device in the disabled operational state if the second device is determined to output the second signal when the second device is in the disabled operational state.

11. The method of claim 10, further comprising, after sending the disable command signal to the second device, verifying if disablement of the second device is successful, and, after sending the disable command signal to the first device, verifying if disablement of the first device is successful; and issuing a warning indicative of one or both of the disablements of the first and second devices being unsuccessful.

12. The method of claim 10, further comprising:
using the controller to determine if at least a third device of the system operating in a third domain that is connected to the second device to receive the second signal outputted by the second device and is configured to output a third signal is outputting the third signal when the third device is in a disabled operational state; and
sending a disable command signal from the controller to the first device or the second device or both to place the first device or the second device or both in the disabled operational state if the third device is determined to output the third signal when the third device is in the disabled operational state.

* * * * *